United States Patent [19]

Budge

[11] Patent Number: 4,498,410

[45] Date of Patent: Feb. 12, 1985

[54] ELECTIVELY DETACHABLY COUPLED BALL JOINT AND PIVOT CUP COMBINATION FOR A WIND-PROPELLED SURFBOARD

[76] Inventor: James D. Budge, 1031 16th St., Santa Monica, Calif. 90403

[21] Appl. No.: 402,649

[22] Filed: Jul. 28, 1982

[51] Int. Cl.³ .................................................. B63B 15/00
[52] U.S. Cl. ........................................ 114/91; 403/129
[58] Field of Search ................ 114/39, 91, 249, 39.2; 403/76, 90, 122, 128, 129; 280/511, 514

[56] References Cited

U.S. PATENT DOCUMENTS

| 1,333,432 | 3/1920 | Maier | 403/90 |
| 4,044,725 | 8/1977 | Miller | 403/122 X |
| 4,236,476 | 12/1980 | Solf et al. | 114/39 X |

FOREIGN PATENT DOCUMENTS 1351449  5/1974  United Kingdom ................. 403/90

*Primary Examiner*—Sherman D. Basinger
*Attorney, Agent, or Firm*—W. Edward Johansen

[57] ABSTRACT

The present invention is an electively detachably coupled ball joint and pivot cup combination for electively detachably coupling a mast to a surfboard. The electively detachably coupled ball joint and pivot cup combination includes a pivot cup which is pivotally and rotationally coupled to the surfboard and an annular plate which is disposed on and mechanically coupled to the peripheral edge of the opening of the pivot cup. The electively detachably coupled ball joint and pivot cup combination also includes a spherical member which has been cut into a plurality of sections and which, when not held apart, may be either inserted into or removed from the pivot cup through the annular plate with each of the plurality of sections of the spherical member being loosely coupled to the mast and a sleeve into which the mast is inserted and which is slidably coupled to the mast. A spring resiliently biases the sleeve against the plurality of sections of the spherical member so that the plurality of sections of the spherical member, which are spaced apart, are secured in the pivot cup whereby the application of a force overcoming the resiliently biasing force of the spring moves the sleeve away from the plurality of sections of the spherical member thereby enabling the plurality of sections of the spherical member to move closer together in order to release the spherical member from the pivot cup.

4 Claims, 9 Drawing Figures

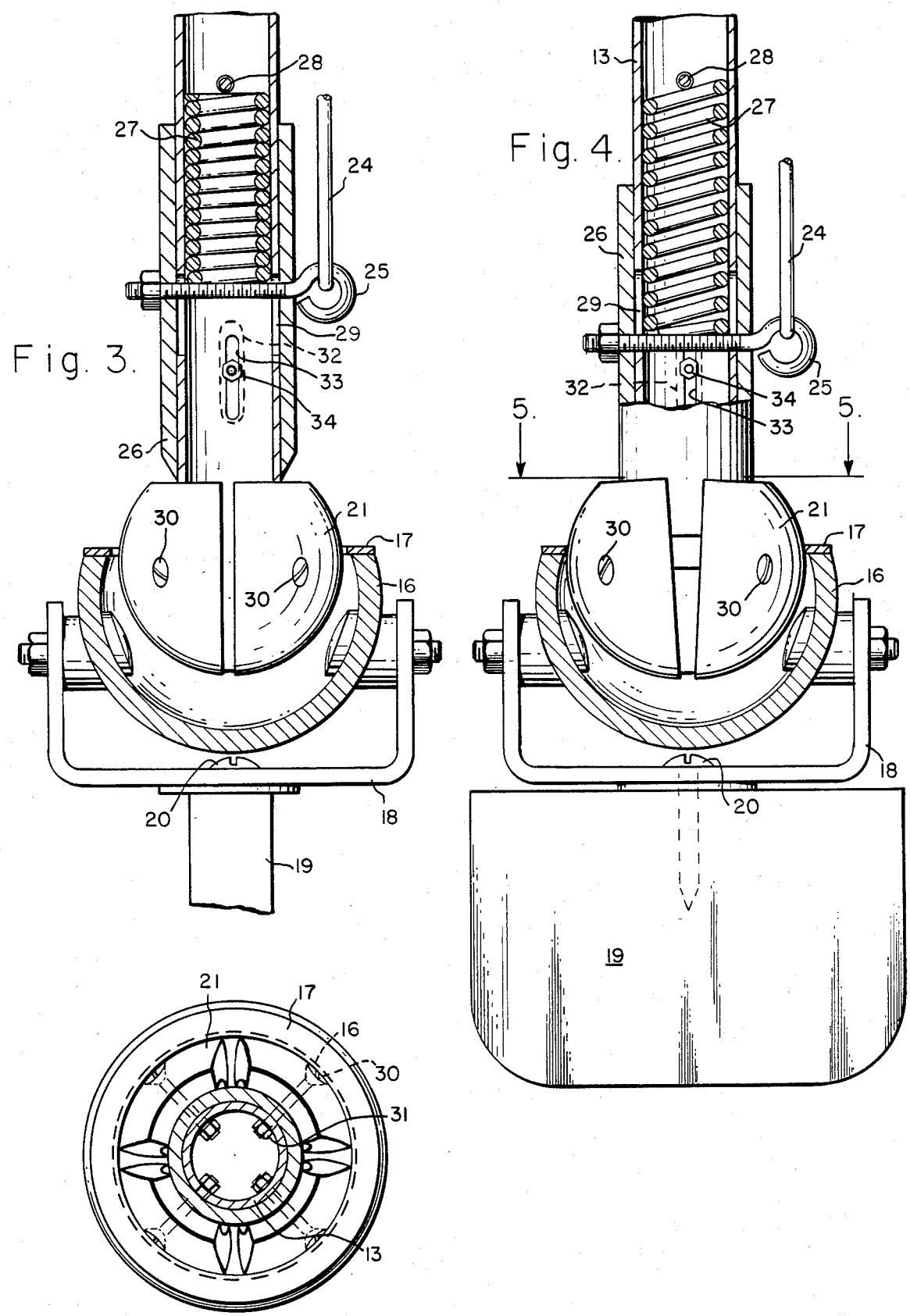

ELECTIVELY DETACHABLY COUPLED BALL JOINT AND PIVOT CUP COMBINATION FOR A WIND-PROPELLED SURFBOARD

BACKGROUND OF THE INVENTION

1. Field of the Invention

The present invention relates to an electively detachably coupled ball joint and pivot cup combination, and more particularly to a ball joint combination for electively detachably coupling a mast to a surfboard.

2. Description of the Prior Art

U.S. Pat. No. 3,487,800, entitled Wind-Propelled Apparatus, issued to Hoyle Schweitzer and James Drake on Jan. 6, 1970, teaches a wind-propelled apparatus which includes a mast which is universally mounted on a craft and which supports a boom and a sail. The position of the mast and sail is controllable by the user on the craft, but the mast is substantially free from pivotal restraint in the absence of such control. The wind-propelled apparatus may also include a pair of curved booms, which are arcuately athwart the mast. Wind-surfing has proved to be popular outdoor sport, but it is limited to lakes, large rivers or the ocean. Additionally, the mast is not detachably coupled to the surfboard. Furthermore, wind-surfing is also limited to individuals who are strong enough to lift the mast and sail out of the water.

U.S. Pat. No. 4,236,476, entitled Articulate Mast Footing Arrangement, in Particular for Wind Surfboards, issued to Alexander Solf and Christian Mrozek on Dec. 2, 1980, teaches a connecting arrangement for connecting two elements with one another, particularly a mast and a boat body of a wind surfboard. The connecting arrangement includes a male member which is connected with one of the elements, and a female member which is engageable with the male member with a snap action and is connected to another of the elements. At least one of the members connected with a respective one of the elements is rotatable within the horizontal plane. Preferably, this one member is rotatable within the range of 360 degrees. The male member and the female member together form a spherical joint. The male member may include a bolt section and a spherical section connected therewith whereas the female may include a bolt portion and a cup portion connected therewith for receiving the spherical section of the male member therein.

U.S. Pat. No. 3,982,766, entitled Wind-Propelled Skateboard, issued to James D. Budge on Sept. 28, 1976, teaches a wind-propelled skateboard which includes a body member having roller bearing wheels for transporting a skateboarder over a concrete or asphalt surface, a mast, which is detachably coupled to the body member in a manner that it is substantially free from pivotal restraint, a boom coupled to the mast by a hinge, and a sail coupled to the both the mast and the boom.

U.S. Pat. No. 4,130,292, entitled Apparatus for Propelling a Skate Board with Wind Currents, issued to A. Michael Lorenz on Dec. 19, 1978, teaches an apparatus for propelling a skate board with wind currents which includes a base plate coupled to the base of the skate board, a mast and sail combination, and a swivel member which is coupled to the base plate and which defines a mast receptacle for the mast. The swivel member provides free rotational movement of the mast without appreciable tilting movement of the mast in relation to the base plate. U.S. Pat. Nos. 4,200,302, 3,895,597 and 3,858,542 also teach sail-propelled vehicles.

U.S. Pat. No. 3,982,766 also teaches a combination of a pivot cup which is mounted to the base of the skateboard and a ball joint which is fixedly coupled to the mast so that the mast is detachably coupled to the skateboard.

In the July, 1981 issue of Sail there appeared an article, entitled "Board Sailing," in which the maststep was discussed on pages 16 and 18. The maststep is the most important part of the rigging of a wind-propelled surfboard. When one puts the mast up, he wants it to stay up. Pressure/friction, o-ring, and adjustable/expandable systems are three popular solutions to the problem. The mast is coupled by a universal joint to the surfboard. The pressure/friction system is the most straightforward for the coupling of the mast receptacle to the surfboard in that one just pushes hard the mast receptacle into the surfboard. The other two systems come out to easily in that the o-ring system tends to get sand in it and slips out of the surfboard and the adjustable/expandable system are difficult to tighten enough, especially when it is wet.

It would be desirable to provide a non-detachable mast receptacle and a mast which is electively detachably coupled to the mast receptacle. Presently there are no electively detaching universal joints. If there were such a universal joint when the sail and frame could be attached or detached in a few seconds without having to lay down the sail and frame while the attachment is made, and then pick up the sail and frame again to start riding. Furthermore it would allow the rider to lift the sail and mast out of the mast receptacle while riding in order for him to perform hand held sailing or place the mast in a different mast receptacle on the surfboard.

SUMMARY OF THE INVENTION

In view of the foregoing factors and conditions which are characteristic of the prior art it is the primary object of the present invention to provide an electively detachably coupled ball joint and pivot cup combination for electively detachably coupling a mast to a surfboard so that a rider may lift the sail and mast during his ride for hand held sailing.

It is another object of the present invention to provide an electively detachably coupled ball joint and pivot cup combination for electively detachably coupling a mast to a surfboard so that the mast will not detach when the rider does not want the mast to detach from the mast receptacle in the surfboard and will detach easily when the rider wants it to detach.

It is still another object of the present invention to provide an electively detachably coupled ball joint and pivot cup combination for electively detachably coupling a mast to a surfboard of the present invention to provide a number of mast receptacles on the surfboard so that the rider may have a number of choices of the placement of the mast in relation to the deck of the surfboard.

It is yet still another object of the present invention to provide an electively detachably coupled ball joint and pivot cup combination for electively decoupling a mast to a surfboard so that the mast will not detach during rigorous boardsailing or wave jumping but will detach from the surfboard spontaneously when dropped in turbulent or rough surf without damaging the mast, the surfboard or the coupling. Furthermore, the tension necessary to spontaneously detach the mast is adjustable by the tension in the spring, the set of the screws, the size and shape of the ball and the diameter of the ring forming the hole in the pivot cup.

In accordance with the present invention an embodiment of an electively detachably coupled ball joint and pivot cup combination for electively detachably coupling a mast to a surfboard is described. The electively detachably coupled ball joint and pivot cup combination includes a pivot cup which is pivotally and rotationally coupled to the surfboard and an annular plate which is disposed on and mechanically coupled to the peripheral edge of the opening of the pivot cup. The electively detachably coupled ball joint and pivot cup combination also includes a spherical member which has been cut into a plurality of sections and which, when not held apart, may be either inserted into or removed from the pivot cup through the annular plate with each of the plurality of sections of the spherial member being loosely coupled to the mast and a sleeve into which the mast is inserted and which is slidably coupled to the mast. A spring resiliently biases the sleeve against the plurality of sections of the spherial member so that the plurality of sections of the spherical member, which are spaced apart, are secured in the pivot cup whereby the application of a force overcoming the resiliently biasing force of the spring moves the sleeve away from the plurality of sections of the spherical member thereby enabling the plurality of sections of the spherical member to move closer together in order to release the spherical member from the pivot cup.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE DRAWING

FIG. 3 is an enlarged partial elevational view of the first electively detachably coupled ball joint and pivot cup combination of FIG. 1 in cross-section when the ball joint is being inserted into or removed from the pivot cup.

FIG. 4 is an enlarged partial elevational view of the first electively detachably coupled ball joint and pivot cup combination of FIG. 1 in partial cross-section when the ball joint has expanded and is secured within the pivot cup.

FIG. 5 is top plan view in partial cross-section of the pivot cup and the ball joint, which is coupled to the mast, of the first electively detachably coupled ball joint and pivot cup combination of FIG. 1

DESCRIPTION OF THE PREFERRED EMBODIMENT

Figure 1:
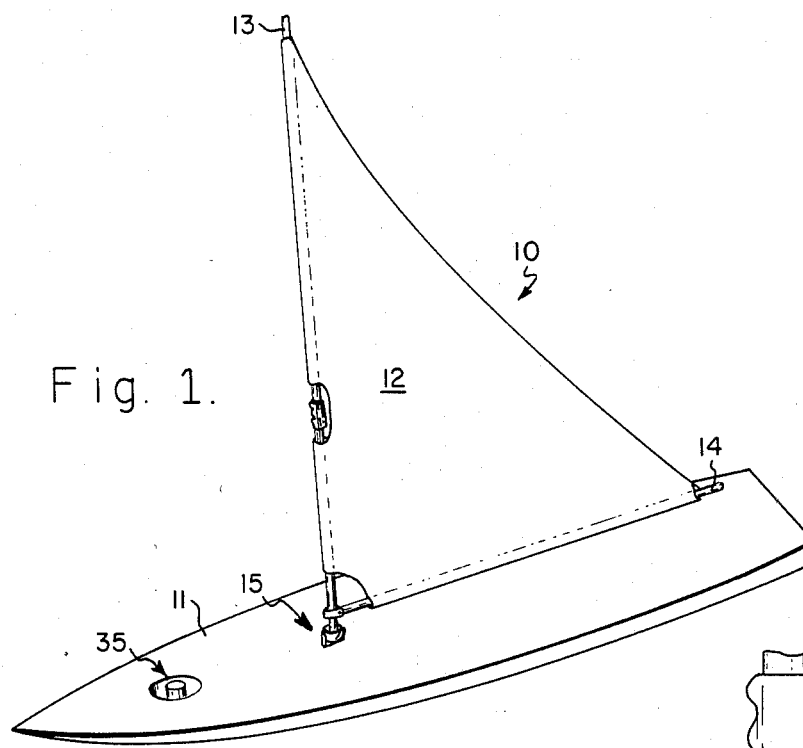
FIG. 1 is a perspective drawing of a windsurfing apparatus with a surfboard, a sail, a mast and boom combination with a first electively detachably coupled ball joint and pivot cup combination which electively couples the mast to the surfboard and which has been constructed in accordance with the principles of the present invention.

In order to best understand the present invention it is necessary to refer to the following description of its preferred embodiment in conjunction with the accompanying drawing. Referring to FIG. 1 a windsurfing apparatus 10 includes a surfboard 11, a sail 12, a combination of a mast 13 and a boom 14 which support the sail 12.

Figure 2:
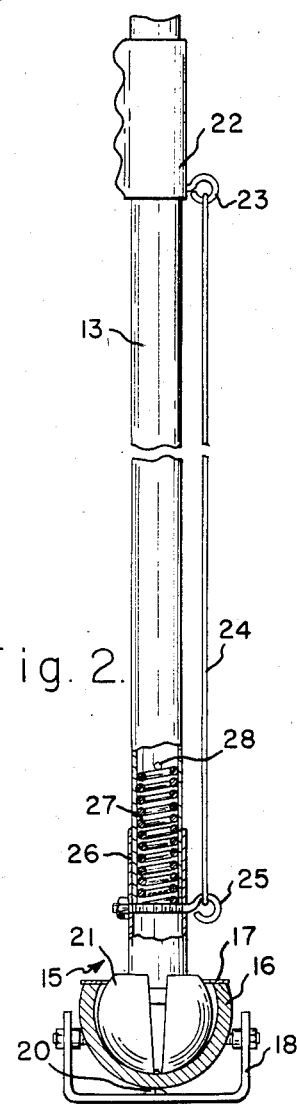
FIG. 2 is an elevational view of the first electively detachably coupled ball joint and pivot cup combination of FIG. 1 in partial cross-section.

Referring to FIG. 1 in combination with FIG. 2 the windsurfing apparatus 10 also includes a first electively detachably coupled ball joint and pivot cup combination 15 for electively detachably coupling the mast 13 to the surfboard 11. The first electively detachably coupled ball joint and pivot cup combination 15 includes a first pivot cup 16 which is pivotally and rotationally coupled to the surfboard 11 and a first annular plate 17 which is disposed on and mechanically coupled to the peripheral edge of the opening of the first pivot cup 16.

Referring to FIG. 1 in combination with FIG. 3 the first pivot cup 16 is pivotally coupled to a U-shaped mounting member 18 which is rotationally coupled to a plug 19 by a bolt 20. The plug is snugly coupled in a plug receptacle in the top surface of the surfboard 11.

Referring to FIG. 2 the first electively detachably coupled ball joint and pivot cup combination 15 also includes a spherical member 21 which has been cut into a plurality of sections which are loosely coupled to the mast 13 at one end. When the sections of the spherical member 21 are not held apart they may be inserted through the first annular plate 17 and the opening of the first pivot cup 16. A handle 22 is slidably coupled to the mast 13 and has a first eyelet screw 23 fixedly coupled thereto. A cable 24 is attached to the first eyelet screw 23 and to a second eyelet screw 25 which is fixedly coupled to a sleeve 26 which is slidably coupled to the mast 13. A spring 27 is disposed inside the hollow mast 13 between the second eyelet screw 25 and an anchor screw 28 and resiliently biases the sleeve 26 against the plurality of sections of the spherical member 21 in a spaced apart relationship so that the plurality of sections of the spherical member 21, once inserted into the first pivot cup 16 may not be removed therefrom. The movement of the sleeve 26 can either expand or allow to contract the spatial relationship between each of the sections of the spherical member 21 thereby either retaining the spherical member 21 in the first pivot cup 16 or releasing the plurality of sections of the spherical member 21 along with the end of the mast 13 from the first pivot cup 16.

Referring to FIG. 3 the mast 13 has a first slot 29 to which the second eyelet 25, which is fixedly coupled to the sleeve 26, is slidably coupled.

Referring now to FIG. 4 in conjunction with FIG. 5 each of the sections of the spherical member 21 are loosely coupled to the mast 13 by a first screw 30 and a first nut 31 and the sleeve 26 which is resiliently biased against the sections of the spherical member 21 whereby the sections of the spherical member 21 are pressed apart within the first pivot cup 16 and secured therein by the first annular plate 17. The spring 27 is held in place by the second eyelet screw 25 which is fixedly coupled to the sleeve 26 and by the anchor screw 28 which is fixedly coupled to the mast 13.

Referring to FIG. 3 in conjunction with FIG. 5 the length which the sleeve 26 can slidably travel along the mast 13 determines how far the plurality of sections of the spherical member 21 are spaced apart from each other. The sleeve 26 has a first slot 32 and the mast 13 has a second slot 33 which is aligned with the first slot 32 of the sleeve 26 so that a screw and nut assembly 34 may be slidably adjusted within and threadedly secured to the second slot 33 of the mast 13. The head of the screw and nut assembly 34 is slidably coupled to the first slot 32 of the sleeve 26 and the relative position of the screw and nut assembly 34 limits the slidable movement of the sleeve 26 along the mast 13. The tension which is necessary to spontaneously detach the mast 13 and the spherical member 21 from the first pivot cup 16 is therefore adjustable. The higher the relative position of the screw and nut assembly 34 in the second slot 33 of the mast 13 is, the less the plurality of sections of the spherical member 21 will be spaced apart from each other so that the mast 13 and the spherical member 21 are more easily detached from the first pivot cup 21. Conversely, the lower the relative position of the screw and nut assembly 34 in the second slot 33 of the mast 13 is, the more the plurality of sections of the spherical member 21 will be spaced apart from each other so that the mast 13 and the spherical member 21 are less easily detached from the first pivot cup 21.

Figure 6:
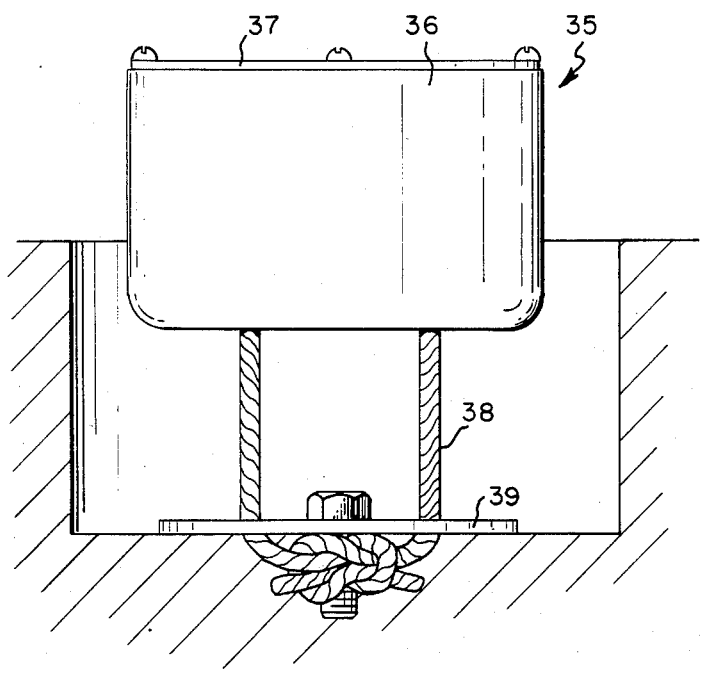
FIG. 6 is an elevational view of a forward pivot cup which is also used in combination with the electively detachably coupled ball joint and pivot cup combination of FIG. 1.

Referring to FIG. 6 in combination with FIG. 1 the windsurfing apparatus 10 also has a forward pivot cup mechanism 35 which includes a second pivot cup 36 and a second annular plate 37 around the peripheral edge of the second pivot cup 36. A cord 38 loosely couples the second pivot cup 36 to a mounting plate 39 which is disposed within an opening in the surfboard 11 and is fixedly coupled to the surfboard 11.

Figure 7:
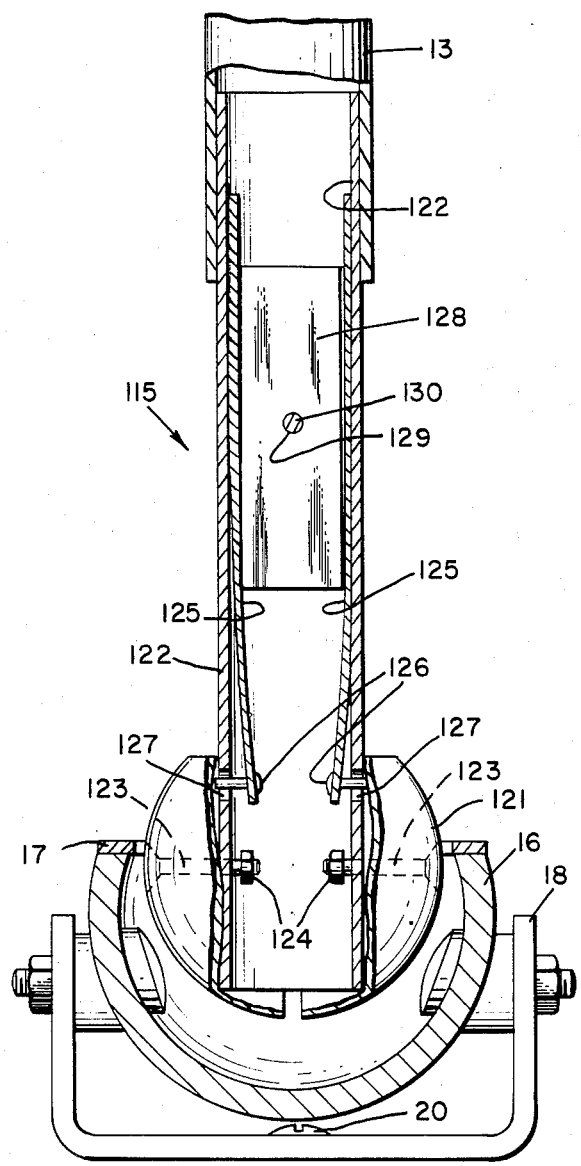
FIG. 7 is an enlarged partial elevational view of a second electively detachably coupled ball joint and pivot cup combination in cross-section when the ball joint is being inserted into or removed from the pivot cup.

Referring to FIG. 1 in combination with FIG. 7 the windsurfing apparatus 10 may include a second electively detachably coupled ball joint and pivot cup combination 115 for electively detachably coupling the mast 13 to the surfboard 11. The second electively detachably coupled ball joint and pivot cup combination 115 includes a first pivot cup 16 which is pivotally and rotationally coupled to the surfboard 11 and a first annular plate 17 which is disposed on and mechanically coupled to the peripheral edge of the opening of the first pivot cup 16.

Referring to FIG. 7 the second electively detachably coupled ball joint and pivot cup combination 115 also includes a spherical member 121 which has been cut into a plurality of sections which are loosely coupled to a mast base 122 at one end. When the sections of the spherical member 121 are not held apart they may be inserted through the first annular plate 17 and the opening of the first pivot cup 16. Each of the sections of the spherical member 121 are loosely coupled to the mast base 122 by a first screw 123 and a first nut 124. A plurality of leaf springs 125, each of which is formed from a resilient material and in the shape of an elongated, rectangular member, are disposed inside the mast base 122. A pin 126 is attached to one end of each leaf spring 125. Each pin 126 is inserted into a hole 127, which is disposed adjacent to the top portion of one of the segments of the spherical member 121, in the mast base 122 so that each of the pins 126 may contact the segments of the spherical member 121 whereby the sections of the spherical member 121 are pressed apart within the first pivot cup 16 and secured therein by the first annular plate 17.

Still referring to FIG. 7 the second electively detachably coupled ball and pivot cup combination 115 further includes a spacer bar 128 which is disposed within the mast base 122 and slidably coupled between the plurality of leaf springs 125 so that position of the spacer bar 128 adjusts the tension of the leaf spring 125. The spacer bar has a threaded hole 129 in which a screw shaft 130 is threadedly coupled.

Figure 8:
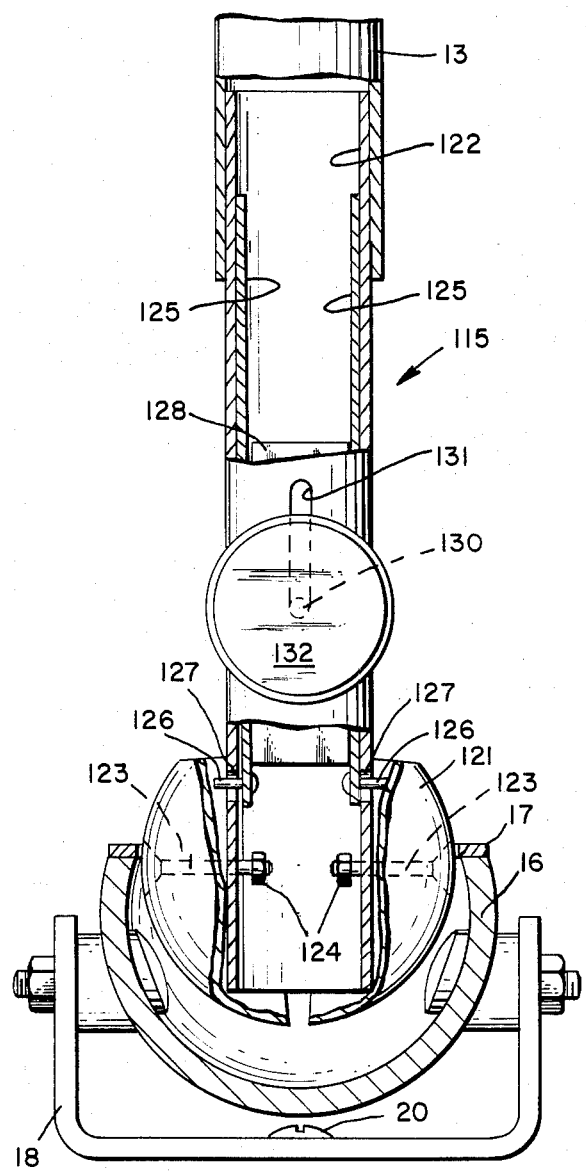
FIG. 8 is an enlarged partial elevational view of the second electively detachably coupled ball joint and pivot cup combination of FIG. 7 in partial cross-section when the ball joint has expanded and is secured within the pivot cup.

Referring to FIG. 8 in conjunction with FIG. 7 there is a slot 131 in the mast base 122 in which the screw shaft 130 slidably travels. A knob 132 is fixedly coupled to the screw shaft 130 and allows the screw shaft 130 to tighten down on the peripheral side edges of the slot 131 in the mast base 122 so that the position of the spacer bar 128, once adjusted, may be secured. The movement of the spacer bar 128 adjusts the tension of the leaf springs 125 so that the spatial relationship between each of the sections of the spherical member 121 is either expanded or allowed to contract thereby either retaining the spherical member 121 in the first pivot cup 16 or releasing the plurality of sections of the spherical member 121 from the pivot cup 16.

In operation the second electively detachably coupled ball joint and pivot cup combination 115 allows a rider of the windsurfing apparatus to decouple the mast 13, mast base 122 and the sections of the spherical member 121 from the pivot cup by a lifting force and snap action. The force necessary to remove the sections of the spherical member 121 from the pivot cup may be adjusted by the rider at the beginning of the ride or in the water merely by adjusting the position of the screw shaft 130 within the slot 131 in the mast base 122 wherein the tension holding the segments of the spherical member 121 is varied. When the knob 132 is set at a light tension position the segments of the spherical member 121 is easy to remove from the pivot cup 16. When the knob 132 is set at a high tension position the segments of the spherical member 121 is either locked into the pivot cup 16 or is difficult to remove from the pivot cup 16 without great force. The knob 132 may be placed at intermediate setting for varying medium degrees of tension so that the second electively detachably coupled ball joint and pivot cup combination 115 is adjustable for release in a similar manner as a ski binding is.

Figure 9:
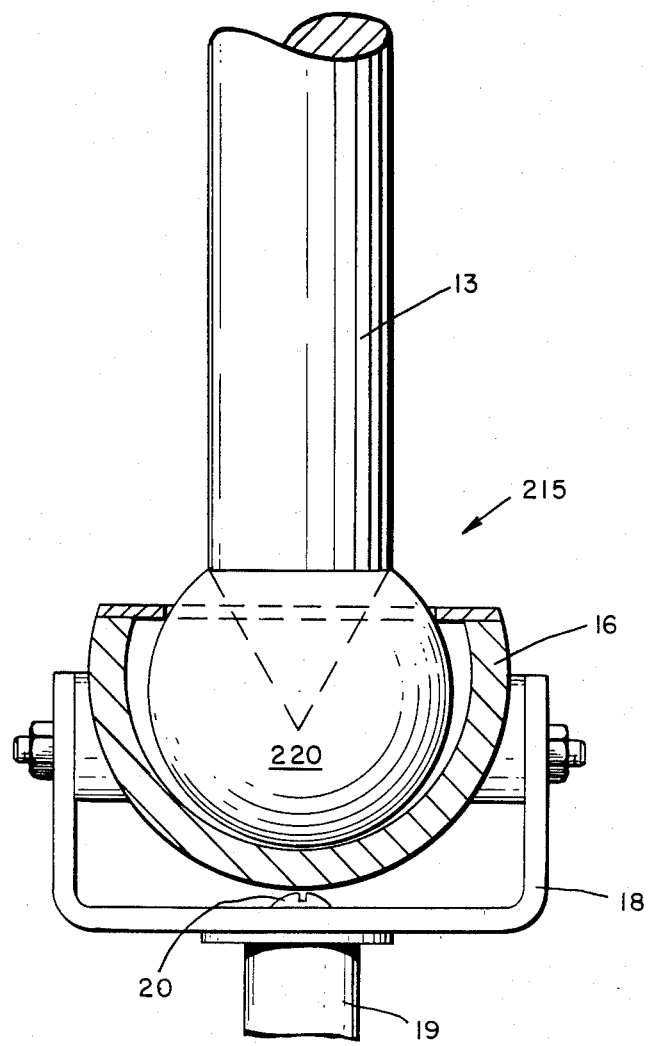

Referring to FIG. 9 the windsurfing apparatus 10 may include a third electively detachably coupled ball joint and pivot cup combination 215 for electively detachably coupling the mast 13 to the surfboard 11. The second electively detachably coupled ball joint and pivot cup combination 215 includes a first pivot cup 16 which is pivotally and rotationally coupled to the surfboard 11 and a first annular plate 17 which is disposed on and mechanically coupled to the peripheral edge of the opening of the first pivot cup 16. The third electively detachably coupled ball joint and pivot cup combination 215 also includes a spherical member 220 which is formed from a resilient material and which is firmly attached to the base of the mast 13 by a set screw.

When the rider presses this spherical member 220 against the annular plate 17 in order to insert the spherical member 220 through the opening of the pivot cup 16, he compresses the resilient material allowing the spherical member 220 to pass through the opening of the pivot cup 16 where the spherical member 220 will remain in its normally expanded state until either the rider or a turbulent water condition applies sufficient lifting force to contract the spherical member 220 in order to detach the mast 13 from the pivot cup 16. The diameter and the resiliency of the spherical member 220 control the amount of force necessary to insert and detach the mast 13 from the pivot cup 16.

From the foregoing it can be seen that an electively detachably coupled ball joint and pivot cup combination 20 for electively detachably coupling the mast 13 to a surfboard has been described. It should be noted that the sketches are not drawn to scale and that distance of and between the figures are not to be considered significant.

Accordingly it is intended that the foregoing disclosure and showing made in the drawing shall be considered only as an illustration of the principles of the present invention.

What is claimed is:

1. An electively detachably coupled ball joint and pivot cup combination for electively detachably coupling a mast to a surfboard, said electively detachably coupled ball joint and pivot cup combination comprising:
    a. a pivot cup which is pivotally and rotationally coupled to the surfboard;
    b. an annular plate which is disposed on and mechanically coupled to the peripheral edge of the opening of said pivot cup;
    c. a spherical member which has been cut into a plurality of sections which are loosely coupled to each other so that said plurality of sections of said spherical member may be either inserted into or removed from said pivot cup through said annular plate, with each of said plurality of sections of said spherical member being loosely coupled to the mast;
    d. a sleeve into which the mast is inserted and which is slidably coupled to the mast; and
    e. resiliently biasing means for resiliently biasing said sleeve against said plurality of sections of said spherical member so that said plurality of sections of said spherical member are resiliently biased against said annular plate and are secured in said pivot cup whereby the application of a force overcoming the resiliently biasing force of said resiliently biasing means moves said sleeve away from said plurality of sections of said spherical member thereby enabling said plurality of sections of said spherical member to move closer together in order to release said spherical member from said pivot cup.

2. An electively detachably coupled ball joint and pivot cup combination for electively detachably coupling a mast to a surfboard, according to claim 1 wherein said electively detachably coupled ball joint and pivot cup combination also comprises adjusting means for adjusting the movement of said sleeve.

3. An electively detachably coupled ball joint and pivot cup combination for electively detachably coupling a mast to a surfboard, said electively detachably coupled ball joint and pivot cup combination comprising:
    a. a pivot cup which is pivotally and rotationally coupled to the surfboard;
    b. an annular plate which is disposed on and mechanically coupled to the peripheral edge of the opening of said pivot cup;
    c. a mast base which is inserted into the mast;
    d. a spherical member which has been cut into a plurality of sections which are loosely coupled to each other so that said plurality of sections of said spherical member may be either inserted into or removed from said pivot cup through said annular plate, with each of said plurality of sections of said spherical member being loosely coupled to said mast base;
    e. resiliently biasing means for resiliently biasing said said plurality of sections of said spherical member apart from each other so that said plurality of sections of said spherical member are resiliently biased against said annular plate and are secured in said pivot cup whereby the application of a force lifting the mast, said mast base and said spherical member overcomes the resiliently biasing force of said resiliently biasing means thereby enabling said plurality of sections of said spherical member to move closer together in order to release said spherical member from said pivot cup.

4. An electively detachably coupled ball joint and pivot cup combination for electively detachably coupling a mast to a surfboard, according to claim 3 wherein said electively detachably coupled ball joint and pivot cup combination also comprises adjusting means for adjusting the tension of said resiliently biasing means.

* * * * *